United States Patent [19]

Sugama

[11] Patent Number: 4,871,395
[45] Date of Patent: Oct. 3, 1989

[54] HIGH TEMPERATURE LIGHTWEIGHT FOAMED CEMENTS

[75] Inventor: Toshifumi Sugama, Mastic Beach, N.Y.

[73] Assignee: Associated Universities, Inc., Washington, D.C.

[21] Appl. No.: 97,737

[22] Filed: Sep. 17, 1987

[51] Int. Cl.$^4$ .............................................. C04B 7/02
[52] U.S. Cl. .................................. 106/88; 106/97
[58] Field of Search ................ 106/314, 315, 88, 87, 106/98

[56] References Cited

U.S. PATENT DOCUMENTS

| | | | |
|---|---|---|---|
| 3,926,650 | 12/1975 | Lange et al. | 106/90 |
| 3,979,217 | 9/1976 | Sutton | 106/88 |
| 4,274,881 | 6/1981 | Laugton et al. | 106/98 |
| 4,304,298 | 12/1981 | Sutton | 106/57 |
| 4,588,443 | 5/1986 | Bache | 106/92 |
| 4,655,979 | 4/1987 | Nakano et al. | 264/42 |
| 4,683,003 | 7/1987 | Nakano et al. | 106/86 |
| 4,684,407 | 8/1987 | Umezawa et al. | 106/90 |
| 4,689,083 | 8/1987 | Gutmann et al. | 106/88 |
| 4,737,193 | 4/1988 | Guhmann et al. | 106/88 |
| 4,759,802 | 7/1988 | Ochi et al. | 106/314 |

Primary Examiner—William R. Dixon, Jr.
Assistant Examiner—Andrew Griffis
Attorney, Agent, or Firm—Margaret C. Bogosian

[57] ABSTRACT

Cement slurries are disclosed which are suitable for use in geothermal wells since they can withstand high temperatures and high pressures. The formulation consists of cement, silica flour, water, a retarder, a foaming agent, a foam stabilizer, and a reinforcing agent. A process for producing these cements is also disclosed.

4 Claims, 2 Drawing Sheets

HIGH TEMPERATURE LIGHTWEIGHT FOAMED CEMENTS

The U.S. Government has rights in this invention pursuant to Contract Number DE-AC02-76CH00016, between the U.S. Department of Energy and Associated Universities Inc.

BACKGROUND OF THE INVENTION

Cement slurries are used to support the intermediate casting pipe in geothermal wells, and to protect the casing from corrosive fluids and gases. The use of normal density cementing slurries (14 to 15.8 lb/gal) or 1.7 to 1.9 g/cc) in geothermal wells frequently results in lost circulation problems, particularly in cement well regions which pass through weak unconsolidated zones. Specifically, these weak zones fail as the result of high hydrostatic pressures required to pump the highly dense cement slurries. One object of the present invention is to provide low density cement slurries, and the process for producing these slurries, which remain stable under high temperature, high pressure conditions.

The foamed cement slurries contemplated by the present invention must be capable of stably withstanding the conditions found in high-enthalpy geothermal wells. These conditions include hydrothermal temperatures of up to 350° C. and hydrostatic pressures up to 2,000 psi.

It is therefore an object of this invention to provide compositions and processes which result in stable foamed cement whose mechanical, physical, and microstructural characteristics are such that these cements can withstand the conditions in high-enthalpy geothermal wells.

It is also an object of this invention to provide processes and compositions for cements capable of stably withstanding 350° C. and pressures up to 2,000 psi.

It is also an object of this invention to provide lightweight cements with sufficient compressive strength and water permeability to stably withstand high-enthalpy geothermal well conditions.

Another object of the present invention is the microscopy observations of the surface microstructure of the foam cements of the present invention show that these stabilized foam cements contain a foam cements show that the stabilized foam cement contained a uniform distribution of the fine bubbles in the foam size range of 5 $\mu$m to 20 $\mu$m (unstabilized cement, in comparison, displays a range of 30 $\mu$m to 200 $\mu$m). The high quality foam cements of the present invention, therefore, contain uniformly distributed fine foam bubbles, thereby improving the mechanical properties and water permeability of the set cement.

Another object of the present invention is the production of reinforced foam cements with high strength. The highest strength achieved (2,310 psi) is found in a cement composition with graphite fiber embedded into the cement matrix. The strength value corresponds to an improvement value of about 1.3 times compared to the control, attributable to graphite's inert reaction to strong alkaline media at high temperatures.

Other objects and characteristics of the cements of the present invention will become evident from the following description.

SPECIFIC DESCRIPTION OF THE INVENTION

Figure 1:
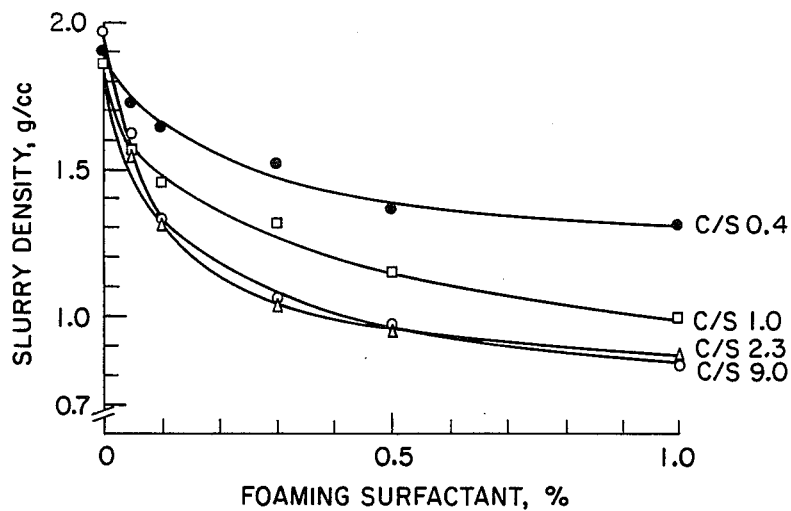
FIG. 1 illustrates the effect of various cement-to-silica ratios on slurry density.

The components of the cementing mix of the present invention include cement, silica flour, water, a retarder, a foam generator, a foam stabilizer, and a reinforcement material. The preferred formulation consists of a mixture of Portland cement (about 20 to 40 wt %), silica flour with a particle size <44 $\mu$m (about 20 to 40 wt %), water (about 20 to 60 wt %), sodium tetraborate decahydrate (borax) as a retarder (about 1 to 5 wt %/cement), sodium alpha olefin sulfate as a foam generator (about 0.1 to 0.5 wt %/water), coconut diethanolamide as a foam stabilizer (about 0.02 to 0.11 wt %/water), and chopped graphite fiber as a reinforcement material (about 0.1 to 0.5 wt %/cement+silica flour+water). A detailed description of each of these components is given below.

Cement. Portland cement is generally preferred as a matrix for the foam cements of the present invention because of its low cost, availability and general utility, but other cements may be used (such as pozzolan or gypsum). Portland cements of American Petroleum Institute (API) Classes H and G are the most preferred, but cements in other API classes may be substituted. A highly useful and effective slurry base composition for use in practicing this invention uses API Class H cement mixed with water to provide a density of from 14 to 15.8 pounds per gallon (1.7 to 1.9 g/cc). The water used in the cementing slurry can be water from any source, provided that the water should not contain an excess of organic compounds, or salts which may affect the stability of the cement composition.

Silica flour. The silica flour components of this invention is a reactive filler with a preferred particle size <44 $\mu$m. Since it is well known that the addition of silica flour prevents strength retrogression of neat cement hydrated in a hydrothermal environment (temperatures above 110° C.), it was determined (as shown in Example 1) that a cement-to-silica ratio of 1.0 appears to be the optimum formulation to produce a high quality lightweight cementitious material.

Retarder. The preferred retarding admixture is sodium tetraborate decahydrate, $Na_2B_4O_7 \cdot 10H_2O$ (borax). This component of the composition is very well known by practitioners in the art, who will recognize that the preferred borax mixture can be substituted with other retarders. For example, some dual action additives, such as lignosulfonates, can be incorporated into the slurry as both a dispersant and a set time retarder.

Foam Generator. The composition also incorporates a foam generator, an agent well known to practitioners in the art as a foaming agent. One method of producing lightweight cement slurries is to introduce air bubbles into an ordinary cement slurry. The small, fine foam bubbles disperse uniformly throughout the slurry, and are believed to promote stronger cement walls around the bubbles, and to provide a set cement of increased integrity. Discrete bubble formation is also important to the creation of high-quality foam cement slurries. When these discrete bubbles are subjected to high pressure conditions, and are chemically and physically stabilized as microscopic cells within the cement slurry (until the cement sets), the result is a hardened foam cement with the suitable compressive strength, low water permeability, and low gas permeability needed to stably withstand geothermal well conditions.

The foam generator contemplated for use in the present invention can be any of a number of organic surfactants, but they must be tolerant of high temperature and high pH. It is pointed out, however, that the invention is not limited to the specific foaming generator employed. One such generator is commercially available sodium alpha olefin sulfate; others include saponin, eptones, albumin, soap bark, water soluble cellulose ethers, hydrated cellulose dispersions, alkylnapthalene sulfonates, stabilized soaps, hydrolyzed proteins, and others, as well as mixtures thereof.

Foam Stabilizer. The above-noted foam generators may also be used in conjunction with one or more foam stabilizers. These include, but the invention is not intended to be limited thereby, coconut diethanolamide, bentonite, or certain of the agents noted above, such as the hydrated cellulose dispersions.

As shown in Example 2, the addition of a foam stabilizer reduces the cement slurry's water permeability and increases the compressive strength of the cementitious composition (while retaining low density characteristics). The presence of the foam stabilizer also reduces large sized foam bubbles which may result in coalescence and percolation of gas through the cement column. These phenomena, associated with unstable foam cement, are due to the breakdown of the cement matrix walls around the large bubbles during thermal expansion of any gas which is trapped in the discrete bubbles.

Reinforcement. The present invention includes the use of fiber reinforcement substances with prevent coalescence and percolation of air through the cement column (as a result of the high hydrostatic pressure and the high temperature). These reinforcement substances include, but are not limited to, chopped E-type glass, graphite, aramid, sisal, hemp, rami, jute, kraft, alumina, carbon, mineral fiber, polypropylene, and cotton. Where the fiber is autoclavable, silica may be used by itself or in combination with a filler.

The initial experiments which lead to the compositions of the present invention showed that the inclusion of only the foam stabilizer in the cement formulation was not sufficient to yield the desired properties. This deficiency is attributed to the separation of gas from the slurry before the cement sets. This separation phenomenon, due to the thermal expansion of air bubbles in the slurries, results in the overflow of an unpredictable portion of the foam slurry from the tubes used as forms. Also, the residual cement slurry appeared to be inordinately compacted by high hydrostatic pressure (a reduction by as much as 23% in the original length of the autoclaved specimens).

To overcome these problems, the preferred cement formulations use fibrous materials as a means of introducing reinforcement which would connect the cement matrix to the bubbles. The preferred fibers are those which exhibit superior thermal resistance in air at a temperature of about 350° C. Example 3 illustrates the importance of fiber reinforcement to the slurry density, the length of the autoclaved cement composition, and to the overall quality of the cement product. This example also shows that the addition of graphite fiber produced the highest quality cement composition.

Process. The air bubble-introduced cellular foam cement slurries of the present invention are prepared according to the following procedures. Generally, a quantity of retarding mixture (borax), to produce a concentration of 3% by weight of cement, is dissolved in water, prior to adding the proper amount of surfactant and stabilizer. After the stabilizer and surfactant are added, the chemically-bubbled liquid is added to a mixture of cement, silica flour, and bridging fiber. The entire formulation is then blended for about 10 minutes using a stirring device. The foam slurry can then be poured into the desired forms in the high temperature, high pressure geothermal or well drilling environment. The thickening temperature of the borax-retarded foam cement slurry ranges from 250° C. to 285° C.

EXAMPLE 1

Since it is well known that the addition of silica flour prevents strength retrogression of neat cement hydrated in a hydrothermal environment, it was assumed that the ratio of the cement to silica flour would effect the development of the foamed cements of the present invention. Example 1 shows the experiments which were performed to determine the cement-to-silica ratio. As is shown in Example 1, the preferred ratio is 1.0.

It was assumed that the ratio of Class H cement (C) to silica flour (S) would also affect the development of strength for the autoclaved foam cements. To verify this assumption, formulations containing four different cement/silica flour ratios (9.0, 2.3, 1.0, and 0.4) were tested to ascertain the ability of the silica flour to develop mechanical strength and to retain a stable foaming structure.

FIG. 1 shows the changes in slurry density of foam cements containing various cement/silica ratios as a function of the sodium alpha olefin sulfonate surfactant concentration. In this test series, the prepared slurry formulations did not contain any of the foam stabilizers or the bridging materials. As seen in FIG. 1, the density of the foam slurries at atmospheric pressure depends primarily on the cement/silica ratio and the surfactant concentration. Increased cement/silica ratios result in decreased slurry densities. Samples without the foaming admixture and containing a cement/silica ratio of 9.0 had the highest density in this test series [16.4 lb/gal (1.97 g/cc)]. The addition of 1.0% surfactant reduced the density to 7.08 lb/gal (0.85 g/cc). In contrast, a cement/silica ratio of 0.4 slurry foamed by adding the same amount of surfactant exhibited a density reduction to only 11.0 lb/gal (1.31 g/cc).

Figure 2:
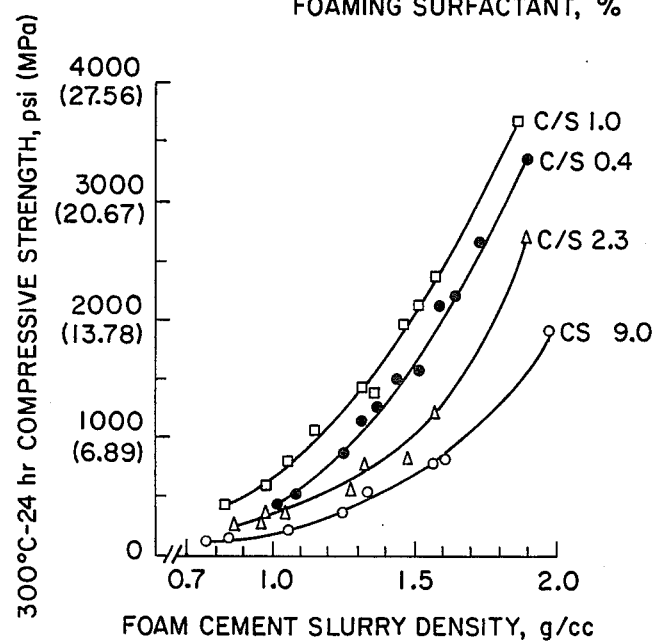
FIG. 2 illustrates the effect of various cement-to-silica ratios on compressive strength of the foam cement.

FIG. 2 illustrates the variation in compressive strength of autoclaved foam cements as a function of the slurry density and the cement/silica ratio. As shown, after curing at 300° C. for 24 hr., the compressive strength related directly to the slurry density. Reducing the cement/silica ratio to values up to about 1.0 in slurries with densities ranging from 6.3 to 16.4 lb/gal (0.76 to 1.97 g/cc), results in increased strength values. The strength values for the C/S 0.4 specimens were relatively lower than those for the C/S 1.0 series. The data also indicate that slurry specimens with a density less than about 9.16 lb/gal (1.1 g/cc) did not attain a strength of 221,000 psi (6.89 MPa), the design criterion. A strength in excess of 1,000 psi (6.89 MPa) was achieved with the C/S 1.0-containing slurry which had a density of 9.6 lb/gal (1.15 g/cc).

EXAMPLE 2

In attempts to produce strong cement walls, the following two methods were tried: (1) the production of a uniform dispersion of small fine foam bubbles throughout the slurry by incorporating an adequate amount of foam stabilizer, and (2) reinforcement of the cementing matrix by randomly distributing fibrous materials into the slurry.

The results from slurry density tests and water permeability and compressive strength measurements made on the hardened foam cement specimens after exposure in an autoclave for 24 hr. at 300° C. are given in Table 1. The data are summarized as a function of the concentration of the coconut diethanolamide foam stabilizer. As is evident from these results, the addition of the foam stabilizer appears to make a significant contribution to reducing the water permeability and to increasing the compressive strength, while retaining the low slurry density. A 300° C.-24 hour strength in excess of 1,500 psi (10.34 MPa) combines with water permeability less than $5 \times 10^{-3}$ darcys was achieved by the incorporation of 0.11% stabilizer. These strength and permeability values correspond to an increase of about 1.6 times for the former, and an approximate factor of 10 decrease in permeability, when compared to the values obtained from the unstabilized specimens.

TABLE 1

Effect of Foam Stabilizer on the Strength and Water Permeability of Foam Cement

| Foam Stabilizer* % | Foam Cement Slurry Density (F.D.) g/cc | Water Permeability Darcy | Compressive Strength, psi |
|---|---|---|---|
| 0.00 | 1.12 | $5.31 \times 10^{-2}$ | 980 |
| 0.02 | 1.13 | $3.95 \times 10^{-2}$ | 1,180 |
| 0.05 | 1.10 | $3.15 \times 10^{-2}$ | 1,380 |
| 0.08 | 1.14 | $1.00 \times 10^{-2}$ | 1,470 |
| 0.11 | 1.11 | $4.36 \times 10^{-3}$ | 1,520 |
| 0.14 | 1.11 | $1.60 \times 10^{-2}$ | 1,411 |

*By volume of water

EXAMPLE 3

Figure 3:
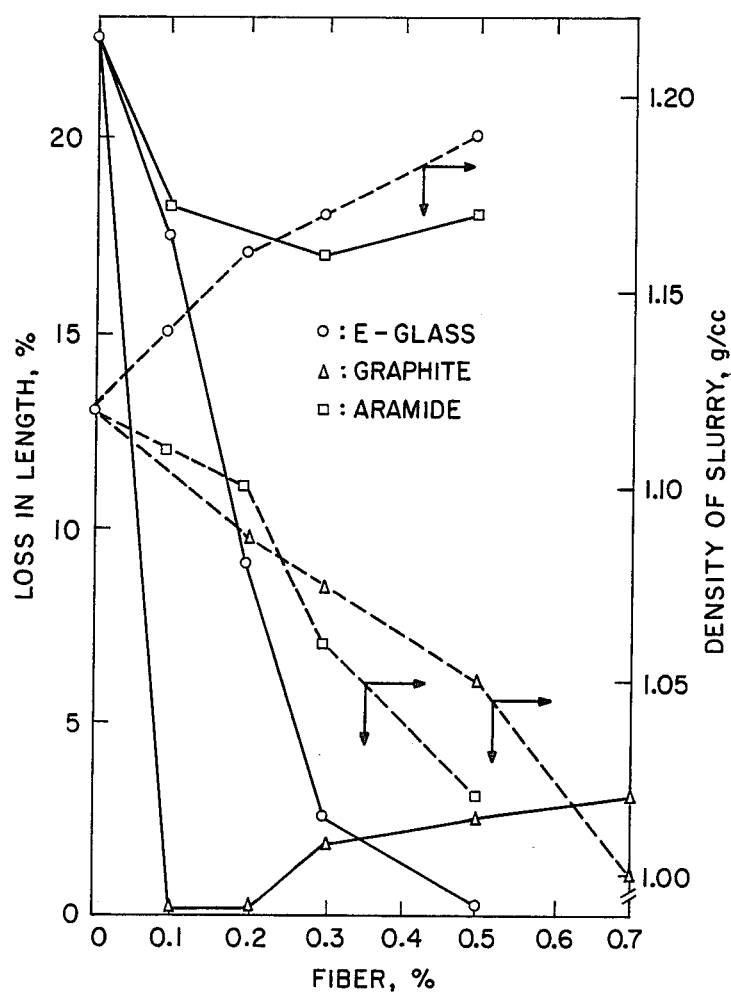
FIG. 3 shows the effect of fibrous materials on the restraint of bubble segregation.

FIG. 3 indicates the changes in slurry density and the loss in length of the autoclaved cured specimens as a function of the fiber concentrations by weight of the total foam cement slurry mass. The densities of the 0.25 in. (6.25 mm) long fibers were 159, 89.8, and 112.3 lb/ft.$^3$ (2.55, 1.44, and 1.80 g/cc) for the E-glass, graphite, and aramid fibers, respectively. Although all of the fibers had densities of >88 lb/ft.$^3$ (1.41 g/cc), the consistencies of foam slurries made with the graphite and aramid fibers declined from 9.3 lb/gal (1.12 g/cc) for the unreinforced lsurry to <8.8 lb/gal (1.06 g/cc) for the 0.5% concentration. The reason for the density reduction is the inclusion of additional air into the foam slurry as the tangled fine fibers were mixed into the formulation. In contrast, the incorporation of glass fiber resulted in an increase in density.

Length changes for specimens autoclaved for 24 hr. at 300° C. were significantly reduced by the addition of either the E-glass or the graphite fibers, but the graphite fiber was the more effective one. As seen in FIG. 3, the overflow of graphite-reinforced foam slurry was constrained by the incorporation of a small amount of fiber, ranging from 0.1 to 0.2% concentrations. Using E-glass fiber, about 0.5% is likely to be required to attain dimensional stability. On the other hand, no significant effects were visually observed for the aramid-reinforced slurries.

Further tests were performed to determine if changes in the compressive strength of the fiber-reinforced foam cement occurred upon continued exposure in the autoclave environment. In this work, foam cement slurry systems containing 0.3% fiber were cast into 1.4 in. diameter by 2.8 in. long (3.5 cm by 7.0 cm) glass tubes. After these specimens were exposed in the autoclave at a temperature of 300° C. for up to 10 days, compression strengths were measured. The data were then correlated with the phase analysis of reaction products identified using x-ray powder diffraction (XRD), and the morphological features of the crystal and composite forms using SEM.

For the unreinforced foam cement specimens, the strength developed after 1 day of autoclaving increased with exposure time up to 3 days. At this age, the strength of 1,780 psi was only 17% greater than that of the 1-day autoclaved specimens. Further autoclave exposure produced no significant increase in strength. This suggests that about 85% of the ultimate strength is developed within the first 24 hrs. The XRD pattern in the diffraction range 4.44 to 2.56 Å for a 24 hr. aged specimen was characterized by strong lines at 4.24 and 3.33 Å, medium intensities at 4.20, 3.13, 2.83, and 2.64 Å, and weak diffractions at 3.83, 3.75, 3.49, and 3.02 Å. The spacings at 4.24 and 3.33 Å, indicate the presence of unreactive silica flour. Consideration of all of the other spacings lead to the conclusion that the major hydration product formed after a one-day exposure in the autoclave was truscottite [$Ca_{14}Si_{24}O_{58}(OH)_8 \cdot 2H_2O$].

Specimens exposed in the autoclave for 10 days formed a well-crystallized truscottite. This was indicated by noteworthy decreases in the peak intensities of 4.44 and 2.56 A spacings which represent the silica, and the further growth of wide peak at 4.20, 3.13, and 2.83 A.

Trends in compressive strength similar to those exhibited by the unreinforced specimens were obtained from the graphite and the E-glass fiber-reinforced foam cement composites. Namely, the ultimate strength of the reinforced specimens was essentially attained within 3 days. Although the fiberglass is susceptible to chemical decomposition in strong alkaline media, samples reinforced with 0.3 fiber were stronger than the control by a factor of about 1.1. The reasons for the improved mechanical properties may be that the silicate ions, which were dissolved by degradation of the fiber surface in hot alkaline environments, react with $Ca^{2+}$ ions dissociated from the cement. This hydrothermal reaction leads to the precipitation of C-S-H compounds in the vicinity of the fiber surface. The precipitated crystal compounds serve a crosslinking function to connect the hydrated cement and the fiber. As expected, the microstructure shows a continuous layer of well-crystallized truscottite coating the surfaces of the fiberglass.

The highest strength developed in all the reinforced foam composites (2,310 psi) was achieved by embedding graphite fiber into the cement matrix. The strength value corresponds to an improvement factor of about 1.3 times compared to that of the control. Since the graphite is inert to strong alkaline media at high temperatures, the SEM image of the fracture surface shows fiber debonding behavior. After debonding, the presence of the smooth and clean surface of the fiber and some pits with column-like shapes definitively demonstrate that the magnitude of interfacial interaction between the fiber and the truscottite matrix is relatively low. This low magnitude relates directly to a low interfacial shear strength and an adhesive failure mechanism by which the adhesion loss in the bond system occurs at or near the fiber-to-matrix interfaces. This indicates that the decreased fiber-matrix interaction results in an increase in the frictional stress transfer with fiber-matrix movement, thereby improving the postcracking behavior of fiber-reinforced foam cements.

EXAMPLE 4

A cement was produced using the procedure noted in the specific disclosure and containing 35 wt % Class H Portland cement, 35 wt % silica flour, 30 wt % water, 3 wt %/cement sodium tetraborate dehydrate, 0.1 to 0.5 wt %/water sodium alpha olefin sulfonate, 0.02 to 0.11 wt %/water coconut diethanolamide, and 0.1 to 0.5 wt %/(cement+silica+water) graphite fiber. The result was a lightweight slurry having a density of 9.61 lb/gal (1.15 g/cc), having a compressive strength at 24 hours of >1,000 psi and having a water permeability of about $10^{-3}$ darcys. The factors responsible for the attainment of these mechanical and physical properties were identified to be well-crystallized truscottite phases and a uniform distribution of discrete fine bubbles. The addition of graphite fiber reinforcement for the cement matrix increased the mechanical characteristics of the cured cement and significantly suppressed any segregation of foam caused by thermal expansion of the air bubbles.

I claim:

1. A lightweight foamed cement slurry composition having, when exposed to temperatures up to 350° C., a slurry density of between 1.1 g/cc and 2.0 g/cc and, upon curing, a compressive strength of greater than 1,000 psi which consists essentially of:
   (a) a cementitious matrix comprising a cement and silica flour wherein the cement to silica flour ratio is approximately 1.0;
   (b) a retarder to retard the setting of the cement;
   (c) a foam generator comprising a foaming agent and a foam stabilizer wherein the addition of said foam generator to said cementitious matrix results in a foamed cement containing a uniform distribution of fine foam bubbles in the size range of from approximately 5 μm to 20 μm;
   (d) a reinforcement material; and
   (e) water.

2. The composition of claim 1 wherein said cement is a Class H Portland cement, said retarder is a borate compound, said foaming agent is a sulfonate compound, and said reinforcement material is a graphite fiber.

3. The composition of claim 2 wherein said retarder is sodium tetraborate decahydrate, said foaming agent is sodium alpha olefin sulfate and the foam stabilizer is coconut diethanolamide.

4. A cement slurry composition consisting essentially of
   (a) a cementitious matrix comprising Portland cement and silica flour in which the amount of the Portland cement used is 20 to 40% by weight of the total cement slurry, the amount of the silica flour used is 20 to 40% by weight of the total cement slurry, and the Portland cement to silica flour ratio is approximately 1.0;
   (b) water, wherein the amount of water used is 20 to 60% by weight of the total cement slurry;
   (c) sodium tetraborate decahydrate, wherein the amount of the sodium tetraboratedecahydrate used is about 1 to 5% by weight of the Portland cement component of the cementitious matrix;
   (d) sodium alpha olefin sulfate, wherein the amount of the sodium alpha olefin sulfate used is about 0.1 to 0.5% by weight of the water component of the slurry;
   (e) coconut diethanolamide, wherein the amount of the coconut diethanolamide used is about 0.02 to 0.11% by weight of the water component of the slurry; and
   (f) graphite fiber, wherein the amount of the graphite fiber used is about 0.1 to 0.5% by weight of the total weight of the Portland cement and silica flour and water components of the cement slurry.

* * * * *